(No Model.) 2 Sheets—Sheet 1.

L. B. ROWLEY.
BATTERY SYSTEM FOR ELECTRIC RAILWAYS.

No. 512,907. Patented Jan. 16, 1894.

WITNESSES:
Frank S. Ober.
H. A. Opperman.

INVENTOR,
Leslie B. Rowley
BY
Wm. W. Rosenbaum
ATTORNEY.

(No Model.) 2 Sheets—Sheet 2.

L. B. ROWLEY.
BATTERY SYSTEM FOR ELECTRIC RAILWAYS.

No. 512,907. Patented Jan. 16, 1894.

WITNESSES:
Frank S. Ober
H. A. Opperman

INVENTOR,
Leslie B. Rowley
BY
Wm A. Rosenbaum
ATTORNEY.

UNITED STATES PATENT OFFICE.

LESLIE B. ROWLEY, OF ASHLAND, WISCONSIN.

BATTERY SYSTEM FOR ELECTRIC RAILWAYS.

SPECIFICATION forming part of Letters Patent No. 512,907, dated January 16, 1894.

Application filed February 15, 1893. Serial No. 462,388. (No model.)

*To all whom it may concern:*

Be it known that I, LESLIE B. ROWLEY, a citizen of the United States, residing at Ashland, in the county of Ashland and State of Wisconsin, have invented certain new and useful Improvements in Electric Railways, of which the following is a full, clear, and exact description.

This invention pertains to the transmission of power for electric railways and for other purposes.

The invention involves the use of constant-current generating apparatus in the circuit of which are arranged in series, groups of secondary batteries which are located along the line of consumption in any desired proximity thereto. The groups of batteries are arranged in correspondence with blocks or sections into which the railway or other system is divided. To each block there is assigned a number of batteries, one or more of which are being constantly charged from the generating station, while the remainder of them are supplying working current to the block or system to which they correspond. So long as there are no translating devices on a particular block, the batteries for that block are all being charged and the batteries of each block or section, alternately supply the working current thereto. Thus the batteries are alternately charged and discharged, as a result of which the load upon the generator is maintained substantially constant, and the working circuit is supplied with as large a current as necessary and at a low pressure. Such a system as this has all the advantages of those railway systems in which there is a main insulated feeder and a sectional working conductor, one of the greatest of which is the fact that the exposed or working conductor does not normally carry current, but is only "alive" when a car passes. Leakage is therefore reduced to the minimum.

The details of my invention will now be set forth with reference to the accompanying drawings, in which—

Figure 1:
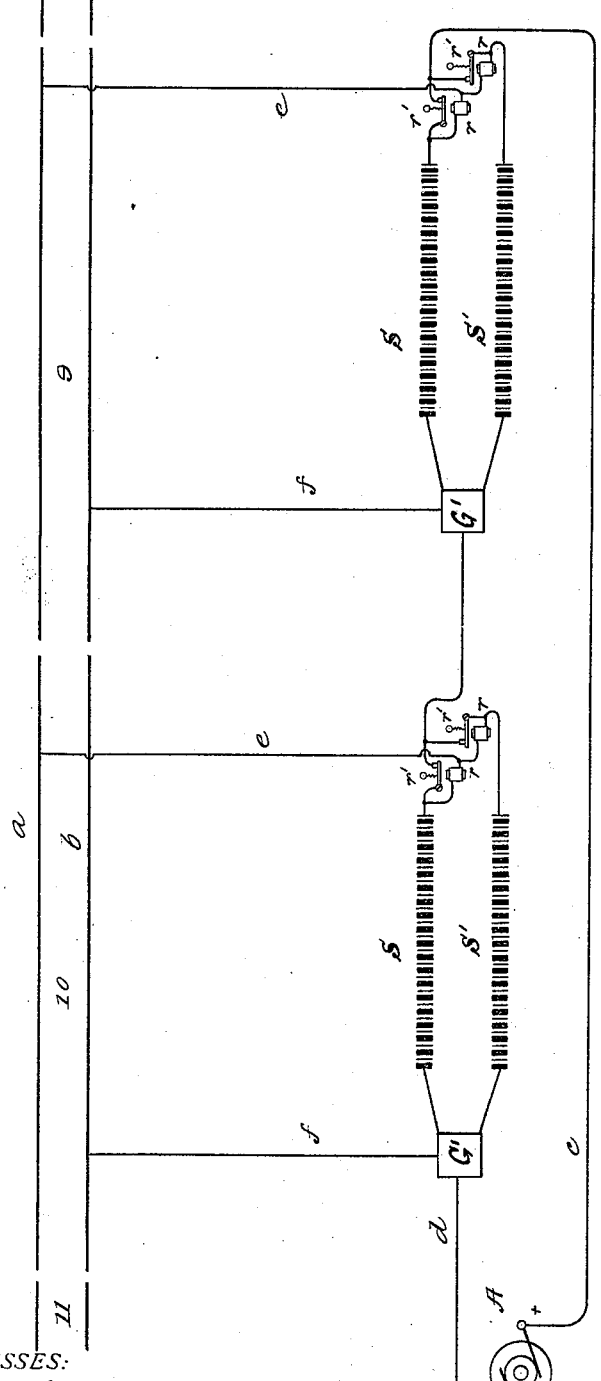
Figure 2:
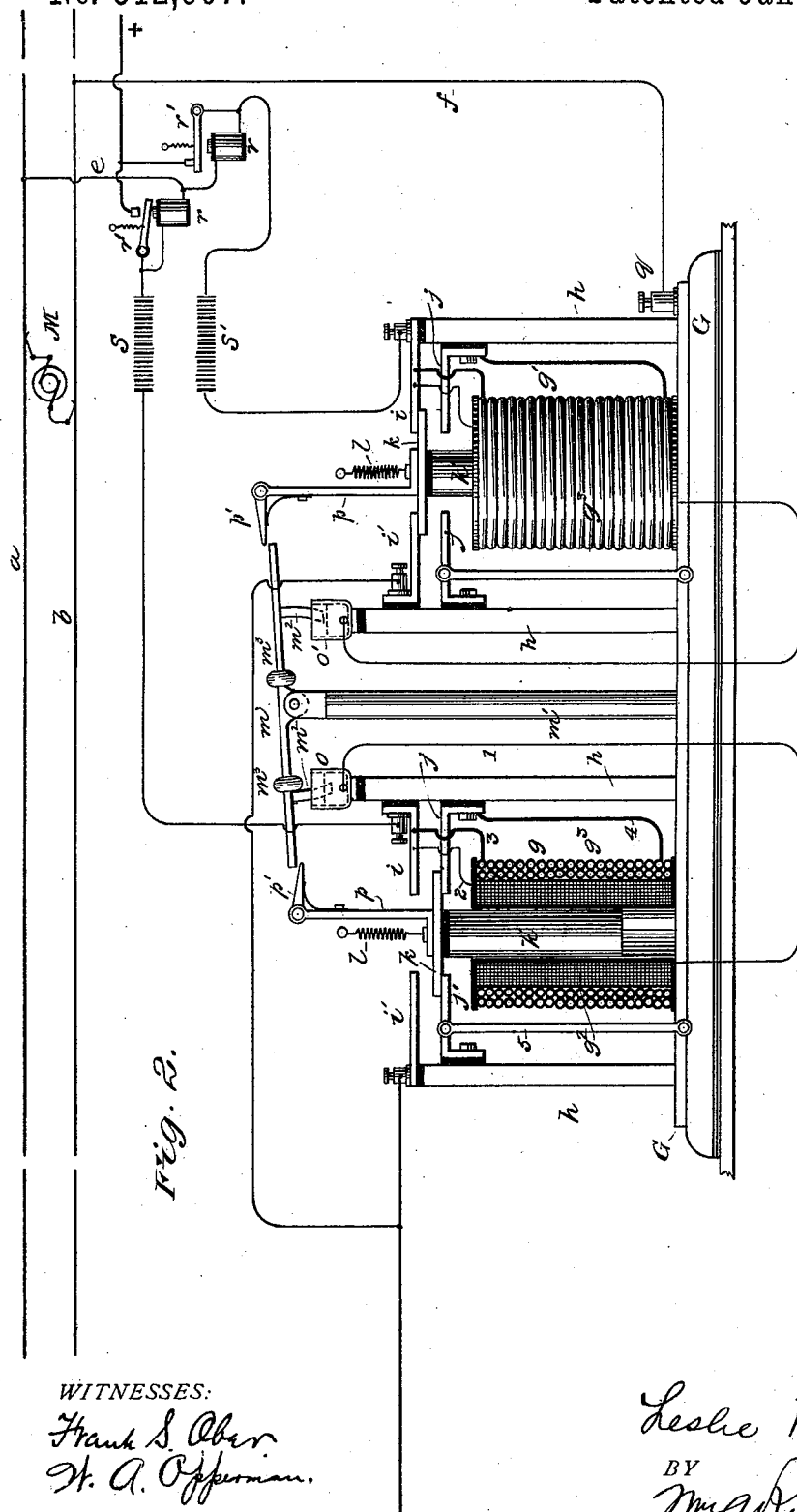

Figure 1 represents a diagram of the apparatus and the circuits. Fig. 2 is a side elevation of the automatic switching apparatus, shown somewhat conventionally, and also, the circuits which it controls.

I shall describe my invention as applied to electric railways, but it is to be understood that the "blocks" herein referred to may be local circuits supplying current to any kind of translating devices.

Referring first to Fig. 1 showing the general plan of the system, 9, 10, 11, &c., represent the blocks into which the railroad is divided. The tracks are not shown but the road is represented by two conductors $a$ and $b$, which may be supported over-head, underground, or in any other position accessible to the cars by a trolley or other collecting device carried thereon. Two of these conductors are shown, because the system will be described in connection with a complete metallic circuit. If a ground return is used only one of these conductors would be needed. The conductors are separated or insulated from each other at the divisions between the blocks and each block is entirely independent from the others.

A represents a constant-current generator of electricity located at a central station and supplying current to the mains $c, d$. These mains extend throughout the road, but are not necessarily in juxtaposition thereto, as they may be run through back streets either under or above ground or in any other way to effectually isolate them. For each block of the track is furnished two sets of secondary batteries S and S', respectively. The batteries of each block are normally connected in multiple in the main circuit of the generator so that they will be charged by a current passing in the same direction through both of them. The positive end of these two sets of batteries, is connected by a wire $e$, with the working conductor $a$ of the block to which they respectively correspond, and the negative end of the batteries is connected by wires $f$, with the working conductor $b$, of the block to which the battery respectively corresponds. At one end of each set of batteries, as here shown, the negative end, is located an automatic switching apparatus G' which is operated by the opening and closing of the circuit through the motors on the cars across the conductors $a$ and $b$. The normal condition of this automatic switch, that is, its condition when the circuit between $a$ and $b$ is open, is such, that both sets of batteries are being charged from the central station, but as soon as a car enters the block, one or the other of these batteries is switched out of the charging circuit and into the circuit of the motor, leaving the other battery in the charging circuit. When the motor has passed out of the block, the switching apparatus changes the conditions, so that when the next motor enters the block, it will get its current from the other battery, while the battery which furnished the power for the preceding motor is being charged. The switching apparatus for doing this work is represented in detail, and somewhat conventionally, in Fig. 2.

G is a metallic base upon which the parts are mounted. As this forms a part of the circuit, it should be insulated from the body supporting it.

$g$, $g'$ are two solenoids, exactly alike in construction, wound in the same direction by fine and coarse wire coils $g^2$, $g^3$. The fine wire has a large number of turns, while the coarse wire has comparatively few. Adjacent to each solenoid are fixed two posts $h$, each of which supports, at its upper end, two metallic plates one pair of which is lettered $i$, $j$, and the other $i'$, $j'$, respectively. These plates extend over the head of the solenoid and between them is located a metallic plate $k$, which is carried upon the upper end of the movable core $k'$ of the solenoid, but is insulated therefrom as shown. The spring $l$ is secured to the core and acts thereupon in opposition to the magnetism. When the magnet is not energized, this spring holds plate $k$ in its upward position where it bridges across the contact pieces $i$, $i'$. When the magnet is energized, plate $k$ is drawn to its lower position where it bridges across contact pieces $j$, $j'$. These contact pieces are all insulated from the posts $h$, or the latter may be made of insulating material. Binding posts are attached to each of the contact pieces $i$, $i'$ for the attachment of line wires. Between or adjacent to, these two solenoids and their attachments is mounted a tilting lever $m$, in the form of a walking-beam or balance. It is pivoted to the upper end of a metallic post $m'$, which is fixed on the base G. The lever is therefore electrically connected with the base. Adjacent to each end of the lever are fixed mercury cups $o$, $o'$, which are insulated from the base. The end of the lever is provided with points $m^2$ which are adapted to dip into the mercury in the cups, and beyond these points the lever is extended for a purpose which will hereinafter appear. On each side of the pivot of the lever, I place a sliding weight $m^3$, in the form of a ring, which, when the lever is tilted downward on one side, slide respectively toward the pivot and the end of the lever thereby shifting the center of gravity and holding the lever in its tilted position. The armature of each solenoid carries an arm $p$, which extends over, adjacent to the respective ends of the lever $m$. At the extremity, the arm is provided with a pivoted finger $p'$, which is held up by a spring strong enough to lift the end of the lever, but if the lever opposes it with excessive force, the spring will give and the finger will slide over or past it. The function of these arms is to lift the end of the lever $m$, when the solenoid core is lifted, and thus reverse the position of the lever. When the arm $p$ is lowered by the pull of the magnet, the finger $p'$ tilts and passes the lever without moving it. To the base G is fixed a binding post $q$, to which a conductor may be attached. This switching apparatus is shown in the drawings to be located at the negative end of the group of batteries, but it may be placed at either end. At the end opposite this switching apparatus is another automatic magnetic circuit-controlling apparatus illustrated on a small scale in Fig. 2. This consists of an electro-magnet $r$, located in two branches of the wire $e$, which leads to the block circuit. The armatures $r'$ of these magnets are located in two branches of the main circuit connecting respectively with the batteries. When either of these magnets is energized, the main or charging circuit is cut off from that particular battery. If desired these magnets may be solenoids of the same construction as the solenoid $g'$, and may have a double break in the circuit instead of the single break shown. This, however, is a matter of detail to which my invention is not limited. In any case, the magnet will be wound with a few turns only, of coarse wire.

An electric motor M is indicated on the block in Fig. 2. It is supposed to be located on a vehicle which carries traveling collectors making contact respectively with the two wires of the block circuit.

The operation of the system is as follows: As long as there are no cars on a block, the armatures of all the electro-magnets of the switching apparatus will be against their back-stops, in which position the charging current will divide and flow through both batteries, the block circuit being open. This charging circuit may be traced on Fig. 2 as follows: From the positive main, through armatures $r'$, electro-magnets $r$, both batteries S, S', contact pieces $i$, plates $k$, contact pieces $i'$, to the negative main. The lever $m$, is supposed to be dipping into one of the mercury cups $o$, $o'$, and both of the arms $p$ are in their elevated positions above the ends of the lever. The moment a car enters the block, the block circuit is closed as follows: From the motor M, to wire $b$, wire $f$, binding post $q$, and base G, then to metallic post $m'$, lever $m$, mercury cup $o$, (assuming the lever to be tipped to the left) wire 1, coil $g^2$ of solenoid, wire 2, contact piece $i$, battery S, magnet $r$, wire $e$, block wire $a$, to the motor. The magnets $r$ and $g$, will therefore be energized and the former in drawing down its armature will cut off the charging circuit from battery S, and the latter in drawing down its armature will break the main circuit across the contact pieces $i$, $i'$, and complete a new circuit across the pieces $j$, $j'$ for the battery current which may be traced as follows: From contact piece $i$, by wire 3, through coil $g^3$, wire 4, contact piece $j$, plate $k$, contact piece $j'$, wire 5, and the base G, when it will unite at $q$ with the current through the fine wire coil $g^2$ of the solenoid. The plate will therefore be held strongly against the contact pieces $j, j'$ and the point of the arm $p$, which has slipped past the end of lever $m$, will stand directly below it. If the car stops on the block or when it has passed out of it before another has entered it, magnets $r$ and $g$ become de-energized and allow the spring to retract them. This will establish the main circuit through the battery S, and the plate $k$ in moving upward causes the tip of arm $p$ to strike and lift the end of lever $m$, thus carrying it up until the opposite point $m^2$ dips into mercury cup $o'$, and the weights $m^3$ have shifted the center of gravity of the lever. When the circuit is again completed by the motor across the conductors $a$, $b$, battery S' will be cut out of the main circuit as before described and will supply the working current to the block circuit, the battery current passing through mercury cup $o'$, instead of through cup $o$. When the circuit is again broken, lever $m$ will be shifted so that battery S will be the next one to supply current to the block. It will be observed that the opening of the circuit throws both batteries into the charging circuit and reverses the position of the switching lever $m$.

This system is adapted for a ground circuit without any change in the switching apparatus whatever. It would simply mean the dispensing with one of the block wires and the negative wires $f$, and carrying the negative terminals of the switching apparatus to ground.

It will be noted that in this system, the load on the generator is maintained substantially constant at all times regardless of the power given out by the batteries. The number of batteries in each block will be regulated by the size of the block, and the number of blocks by the number of cars running. This will be done for the purpose of having the block circuits open at least as long a time, in the aggregate, as they are closed.

Having thus described my invention, I claim—

1. The system of distribution for electric railways consisting of a main circuit including in multiple arc, two or more independent sets of batteries, a working circuit and means for automatically switching the sets of batteries bodily and individually from one circuit to the other substantially as described.

2. In a system of electrical distribution for railways, a main circuit including a group of storage batteries consisting of a plurality of sets of batteries, all of which are normally being charged simultaneously, in combination with a block or working circuit and a switching apparatus arranged to successively switch the sets of batteries from the charging to the working circuit and back again, for the purposes specified.

3. In an electric railway system, a main circuit in combination with a working circuit, the latter being divided into independent blocks, groups of secondary batteries corresponding respectively with the blocks of the working circuit and normally undergoing charge in the main circuit, the batteries of each group being connected in multiple in the main circuit, and means for switching the batteries bodily alternately and in succession from the charging to the working circuits, as set forth.

4. In a system of electrical distribution two secondary batteries connected in multiple with a main circuit, in combination with a working circuit, an electro magnetic device in circuit with each battery, and a switch operated alternately by said electro magnetic devices to alternately throw the batteries out of the main circuit and into the working circuit.

5. In a system of electrical distribution, two secondary batteries connected in multiple with a charging circuit, both normally undergoing charge therein, in combination with a working circuit, an electro magnetic device in each battery circuit and a switch operated alternately by such electro magnetic devices to throw the batteries alternately out of said charging and into the working circuit.

6. In a system of electrical distribution, two secondary batteries connected in multiple with a charging circuit and both normally undergoing charge therein, in combination with a working circuit, an electro magnetic device in each battery circuit and a switch operated alternately by said electro magnetic devices to throw the batteries alternately and successively out of said charging and into said working circuits, said electro magnetic devices being operated by the opening and closing of the working circuit, substantially as described.

In testimony whereof I subscribe my signature in presence of two witnesses.

LESLIE B. ROWLEY.

Witnesses:
C. F. LATIMER,
F. WALLACE FRENCH.